United States Patent
Shaw

(10) Patent No.: US 11,570,793 B2
(45) Date of Patent: Jan. 31, 2023

(54) CONNECTIVITY SCHEDULER FOR NB-IOT DEVICES

(71) Applicant: T-Mobile USA, Inc., Bellevue, WA (US)

(72) Inventor: Venson Shaw, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 22 days.

(21) Appl. No.: 16/945,637

(22) Filed: Jul. 31, 2020

(65) Prior Publication Data

US 2022/0039109 A1    Feb. 3, 2022

(51) Int. Cl.
```
H04W 72/12      (2009.01)
H04W 72/04      (2009.01)
H04W 28/02      (2009.01)
H04W 4/90       (2018.01)
```

(52) U.S. Cl.
CPC ......... *H04W 72/1247* (2013.01); *H04W 4/90* (2018.02); *H04W 28/021* (2013.01); *H04W 72/0446* (2013.01); *H04W 72/0493* (2013.01)

(58) Field of Classification Search
None
See application file for complete search history.

(56) References Cited

U.S. PATENT DOCUMENTS

| | | |
|---|---|---|
| 9,762,556 B2 | 9/2017 | James et al. |
| 9,781,259 B1 | 10/2017 | Kodaypak |
| 9,882,912 B2 | 1/2018 | Joo |
| 9,894,159 B2 | 2/2018 | Chen et al. |
| 9,960,933 B2 | 5/2018 | Ghosh et al. |
| 10,299,269 B2 | 5/2019 | Song et al. |
| 10,314,045 B2 | 6/2019 | Wu |
| 10,389,496 B2 | 8/2019 | Hwang et al. |
| 10,455,418 B2 | 10/2019 | Bartlett et al. |
| 10,484,852 B2 | 11/2019 | Hwang et al. |
| 10,484,863 B1 | 11/2019 | Ramisetty et al. |
| 10,554,293 B1 | 2/2020 | Chin et al. |
| 11,166,153 B1 * | 11/2021 | Carames ........... H04W 36/0022 |
| 2015/0195365 A1 | 7/2015 | Choi et al. |
| 2016/0173495 A1 | 6/2016 | Joo |
| 2016/0205078 A1 | 7/2016 | James et al. |
| 2017/0195136 A1 | 7/2017 | Ghosh et al. |

(Continued)

OTHER PUBLICATIONS

Garcia-Carrillo et al. "A CoAP-Based Network Access Authentication Service for Low-Power Wide Area Networks: LO-CoAP-EAP," Sensors 2017, 28 pages.

(Continued)

*Primary Examiner* — Mohammad S Adhami
(74) *Attorney, Agent, or Firm* — Perkins Coie LLP

(57) ABSTRACT

A method performed by one or more network nodes of a wireless telecommunications network to schedule intermittent connectivity of multiple narrowband Internet-of-Things (NB-IoT) devices with the network. The network node(s) can maintain a connectivity schedule that includes profiles for NB-IoT devices and cause the multiple NB-IoT devices to connect to the network in accordance with the schedule at different times based on priority levels associated with the NB-IoT devices. The network node(s) can adjust the connectivity schedule in response to detection of a condition of the network or the NB-IoT device.

19 Claims, 6 Drawing Sheets

(56) References Cited

U.S. PATENT DOCUMENTS

| | | |
|---|---|---|
| 2017/0201504 A1 | 7/2017 | Funk |
| 2017/0285595 A1 | 10/2017 | Wenus et al. |
| 2017/0288447 A1 | 10/2017 | Guibene et al. |
| 2017/0289788 A1 | 10/2017 | Lalwaney |
| 2017/0374042 A1 | 12/2017 | James et al. |
| 2018/0049181 A1 | 2/2018 | Wu |
| 2018/0049255 A1 | 2/2018 | Chen |
| 2018/0054796 A1 | 2/2018 | Edge |
| 2018/0063841 A1 | 3/2018 | Song et al. |
| 2018/0070317 A1 | 3/2018 | Chen et al. |
| 2018/0092151 A1 | 3/2018 | Liu et al. |
| 2018/0183874 A1 | 6/2018 | Cook |
| 2018/0242165 A1* | 8/2018 | Macmullan ......... H04W 52/367 |
| 2018/0287844 A1 | 10/2018 | Kim et al. |
| 2018/0295007 A1 | 10/2018 | Kumar et al. |
| 2018/0316658 A1 | 11/2018 | Bartlett et al. |
| 2018/0367278 A1 | 12/2018 | Chatterjee et al. |
| 2018/0367285 A1 | 12/2018 | Yi et al. |
| 2018/0376405 A1 | 12/2018 | Han et al. |
| 2019/0028243 A1 | 1/2019 | Kim et al. |
| 2019/0028247 A1 | 1/2019 | Liu et al. |
| 2019/0069150 A1 | 2/2019 | Blankenship et al. |
| 2019/0089568 A1 | 3/2019 | Abedini et al. |
| 2019/0098488 A1 | 3/2019 | Syed et al. |
| 2019/0141609 A1 | 5/2019 | Kim et al. |
| 2019/0182021 A1 | 6/2019 | Shokri Razaghi et al. |
| 2019/0190591 A1 | 6/2019 | Wang et al. |
| 2019/0191363 A1 | 6/2019 | Ahmet et al. |
| 2019/0200202 A1 | 6/2019 | Ko et al. |
| 2019/0239057 A1 | 8/2019 | Hwang et al. |
| 2019/0246390 A1 | 8/2019 | Wu |
| 2019/0357109 A1 | 11/2019 | Hong et al. |
| 2019/0357175 A1 | 11/2019 | Höglund |
| 2019/0357270 A1 | 11/2019 | Kurth et al. |
| 2019/0379664 A1 | 12/2019 | Suthar et al. |
| 2020/0008036 A1 | 1/2020 | Hwang et al. |
| 2020/0037226 A1 | 1/2020 | Magadevan |
| 2020/0045524 A1 | 2/2020 | Hong |
| 2020/0045667 A1 | 2/2020 | Modarres Razavi et al. |
| 2020/0221442 A1* | 7/2020 | Shreevastav .......... H04W 24/10 |
| 2020/0374900 A1* | 11/2020 | Aksu ................ H04W 72/1247 |
| 2021/0209237 A1 | 7/2021 | Gurin |

OTHER PUBLICATIONS

Salva-Garcia et al. "5G-IoT: Efficient Network Traffic Filtering for Multitenant IoT Cellular Networks," Security and Communication Networks, vol. 2018, Article ID 9291506, 22 pages, Year 2018.

\* cited by examiner

CONNECTIVITY SCHEDULER FOR NB-IOT DEVICES

BACKGROUND

Fifth generation (5G) technology aims to operationalize different wireless technologies such as millimeter wave (mW) bands, along with LTE, WiFi, Bluetooth, and legacy cellular standards. 5G can support applications that have never been supported before in any wireless technology, including augmented and virtual reality (AR/VR), internet-of-things (IoT), device-to-device (D2D) communication, machine type communication (MTC), carrier aggregation (CA), dual connectivity (DC), relay nodes, autonomous cars, mission-critical applications, industry automation and control, etc.

5G will be readily used by billions of subscribers around the world that want access to voice-centric technology and rich multimedia applications, video streaming, rich Internet browsing, chatting and voice over legacy IP networks. In addition, 5G networks will need to support billions more Narrowband Internet of Things (NB-IoT) devices. NB-IoT technology is a low power, wide area network (LPWAN) radio technology standard developed by 3GPP to enable a wide range of devices and services. NB-IoT devices have low-complexity, low power consumption, low data rates, use limited bandwidth, extended coverage, and low hardware cost. Some NB-IoT devices have no mobility support.

NB-IoT devices can independently operate in licensed or unused bands of a 5G network and/or by using specific resource blocks allocated by base stations for NB-IoT communications. NB-IoT technology has a core protocol stack and can perform operations that are defined by 3GPP specifications. Examples of NB-IoT applications include smart metering (e.g., electricity, gas, water metering) for commercial services, intruder and fire alarms for homes and other properties for emergency services, and personal applications for measuring health parameters, tracking people, animals, or objects for non-commercial services. Other examples include smart city infrastructures such as smart lamps and connected industrial applications such as welding machines or air compressors.

BRIEF DESCRIPTION OF THE DRAWINGS

Embodiments of the present technology will be described and explained through the use of the accompanying drawings.

Figure 1:
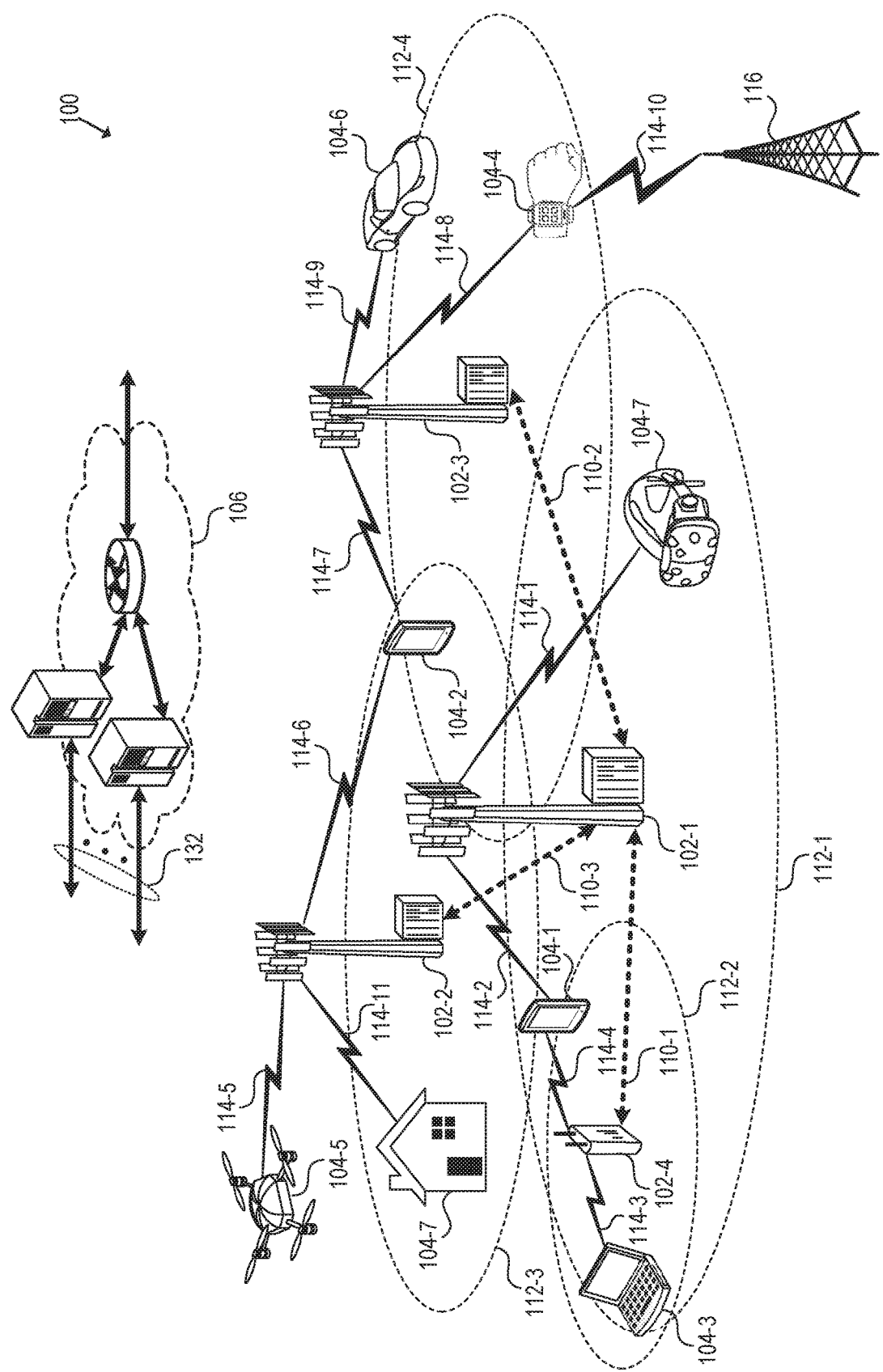
FIG. 1 is a block diagram that illustrates a wireless communications system.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The disclosed technologies relate to solving problems that arise from having numerous internet-of-things devices, such as narrowband internet-of-things (NB-IoT) devices, on telecommunications networks (e.g., 5G networks). The NB-IoT devices have diverse capabilities and are generally designed as low-cost, low-power consumption devices that connect to a 5G network ("network") to report sensor data.

An aspect of the technology includes a connectivity scheduler for NB-IoT devices. A unified data management (UDM) function of a 5G network manages a connectivity schedule, which can be implemented as access policies of a policy control function (PCF). The UDM stores a device profile for each NB-IoT, which includes capability and service information. The capability or service information can be obtained from a session management function (SMF) or an IP multimedia subsystem (IMS) function. The device profiles are used to prioritize intermittent connections based on, for example, service categories such as emergency, commercial, or non-commercial. The connectivity schedule can be adjusted to respond to a network condition, or a NB-IoT capability or service. The adjustment can include causing an NB-IoT device to connect to the network less/more often and/or for shorter/longer time periods.

Another aspect of the technology relates to a virtual universal integrated circuit card (UICC) that is integrated into an NB-IoT host device. An example of a UICC is a SIM card, which provides authentication and encryption functions for smartphones. However, a conventional SIM card is not reconfigurable, is external from its host device, and consumes the same amount of host resources as any other SIM card, which is particularly problematic for diverse, low-power NB-IoT devices that could benefit from flexible authentication and encryption that is less resource intensive to operate. The technology allows a network to dynamically re/configure a virtual UICC, to optimize the availability and utilization of host device resources. As such, the network can determine and allocate an adequate amount of authentication and encryption resources to perform UICC functions. The authentication and encryption resources can be dynamically reset by the network based on, for example, a network condition, NB-IoT device capability, NB-IoT device services, priorities, etc.

Another aspect of the technology is a dynamic NB-IoT key management system that can provide keys of different encryption strengths for different NB-IoT devices. Normally, an NB-IoT device must be authenticated every time that it re/connects to a 5G network, which involves a key exchange with the 5G network. A conventional network typically generates the same types of keys with the same amount of encryption security, which is problematic because 5G networks support numerous diverse, low-cost NB-IoT devices that do not all need the same level of encryption security. For example, NB-IoT devices that pose less security risks or are less critical can use an encryption key with a lower encryption level strength that consumes less resources to generate and process.

The described technology thus improves NB-IoT devices. Additional related features are described in the assignee's related applications including U.S. patent application Ser. No. 16/945,667, filed Jul. 31, 2020, titled "Configurable UICC Integrated in NB-IoT Device," U.S. patent application Ser. No. 16/945,682, filed Jul. 31, 2020, titled "Encryption Key Management for NB-IoT Devices," U.S. patent application Ser. No. 16/945,570, filed Jul. 31, 2020, titled "Detecting Malicious Small Cells Based on a Connectivity Schedule," U.S. patent application Ser. No. 16/849,158, filed Apr. 15, 2020, titled "On-Demand Security Layer for a 5G Wireless Network," and U.S. patent application Ser. No. 16/921,765, filed Jul. 6, 2020, titled "Security System for Managing 5G Network Traffic," each of which are incorporated by reference in their entireties for all purposes.

Wireless Communications System

FIG. 1 is a block diagram that illustrates a wireless communication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred as a cell site, a base transceiver station, or a radio base station. The system 100 can include any combination of NANs including an access point, a radio transceiver, a gNodeB (gNB), NodeB, eNodeB (eNB), Home NodeB, a Home eNodeB, or the like. In addition to being a WWAN base station, a NAN can be a WLAN access point, such as an IEEE 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 are capable of communication using various connectivity standards. For example, a 5G communication channel can use mmW access frequencies of 28 GHz. In some implementations, the wireless device 104 can operatively couple to a base station 102 over an LTE/LTE-A communication channel, which is referred to as a 4G communication channel.

The core network 106 can provide, manage, or control security services, user authentication, access authorization, tracking, Internet Protocol (IP) connectivity, and other access, routing, or mobility functions. The base stations 102 interface with the core network 106 through a first set of backhaul links 108 (e.g., S1) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC)).

In some examples, the system 100 can include a 5G network and/or an LTE/LTE-A network. In an LTE/LTE-A network, the term eNB is used to describe the base stations 102 and, in 5G or new radio (NR) networks, the term gNBs is used to describe the base stations 102 that include mmW communications. The system 100 can form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow unrestricted access by wireless devices with service subscriptions with the network provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively small geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a NB-IoT device, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions may also be called forward link transmissions while the uplink transmissions may also be called reverse link transmissions. Each communication link 114 includes one or more carriers, where each carrier can be a signal composed of multiple sub-carriers (e.g., waveform signals of different frequencies) modulated according to the various radio technologies described above. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some embodiments, the communication links 114 include LTE and/or mmW communication links.

In some embodiments of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that may take advantage of multi-path environments to transmit multiple spatial layers carrying the same or different coded data.

In some embodiments, the wireless devices 104 are capable of communicating signals via the LTE network and an mmW system (e.g., as part of a 5G/NR system). Accordingly, the wireless device 104 can communicate with the base station 102 over an LTE link and/or with a transmission point (TP) or base station (BS) over an mmW link. In another example, at least one of the base stations 102 communicates signals via the LTE network and the mmW system over one or more communication links 114. As such, a base station 116 may be referred to as an LTE+mmW eNB or gNB or as an LTE+mmW TP/BS/mmW-BS.

Figure 2:
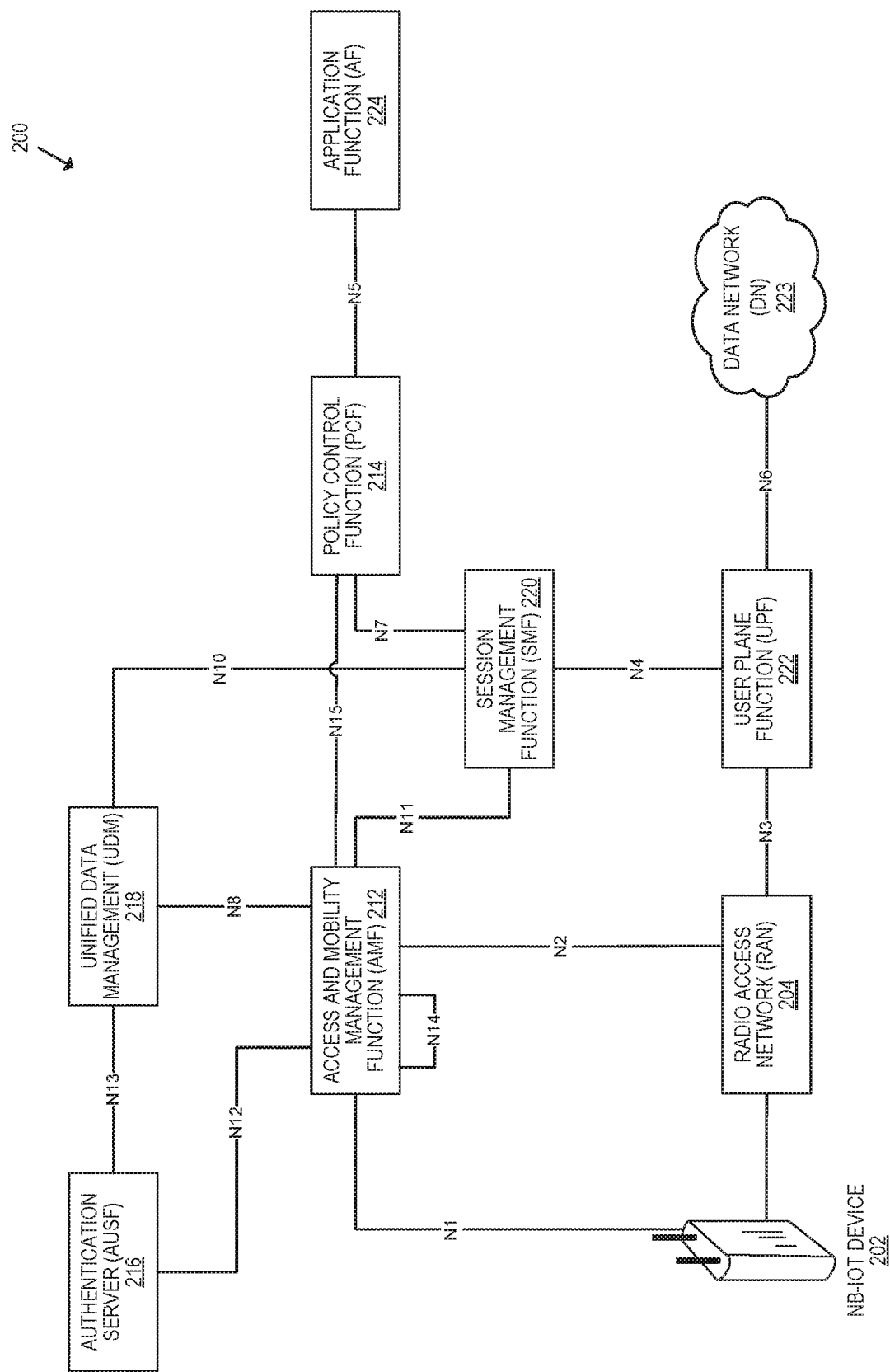
FIG. 2 is a block diagram that illustrates an architecture of network functions of a 5G network.

FIG. 2 is a block diagram that illustrates an architecture of network functions 200 of a 5G network. An NB-IoT device 202 can access the 5G network via a RAN 204, through a NAN such as a small cell. In some implementations, an NB-IoT device can be part of the RAN 204. The architecture of the network functions 200 includes an authentication server function (AUSF) 216, a unified data management (UDM) 218, an access and mobility management function (AMF) 212, a policy control function (PCF) 214, a session management function (SMF) 220, and a user plane function (UPF) 222. The PCF 214 can connect with one or more application functions (AFs) 224. The UPF 222 can connect with one or more data networks (DNs) 223. The interfaces N1 through N15 define the communications and/or protocols between each function or component, as described in relevant standards. The UPF 222 is part of the user plane and the AMF 212, SMF 220, PCF 214, AUSF 216, and UDM 218 are part of the control plane. The UPFs can be deployed separately from control plane functions and the network functions of the control plane are modularized such that they can be scaled independently.

A UDM introduces the concept of user data convergence (UDC) that separates the user data repository (UDR) storing and managing subscriber information from the frontend that processes the subscriber information. The UDM 218 is associated with a database (not shown) that can contain profile data for subscribers and/or other data that can be used to authenticate network entities (e.g., subscribers, wireless devices). Given the large number of wireless devices (e.g., IoT devices) that can connect to the 5G network, the UDM 220 contains a very large amount of data that is accessed by NANs and network functions to authenticate network entities. This leads to high latency of control signaling, along with large numbers of queries across the network for the UDM.

Connectivity Scheduler for NB-IoT Devices

The disclosed technology includes a connectivity scheduler for NB-IoT devices. Examples of the network node(s) include a combination of the network nodes shown in FIG. 2. For example, a UDM function of a 5G network can manage the connectivity schedule, which can be implemented as access policies of a PCF. In particular, the UDM stores a device profile for each NB-IoT, which includes capability and service information. The capability or service information can be obtained from an SMF or an IMS function. The device profiles can be used to prioritize connections based on, for example, service categories such as emergency, business, or leisure. Further, the connectivity schedule can be adjusted in response to changed network conditions or changed device capabilities. The adjustment can include connecting less/more often and/or for shorter/longer periods.

Figure 3:
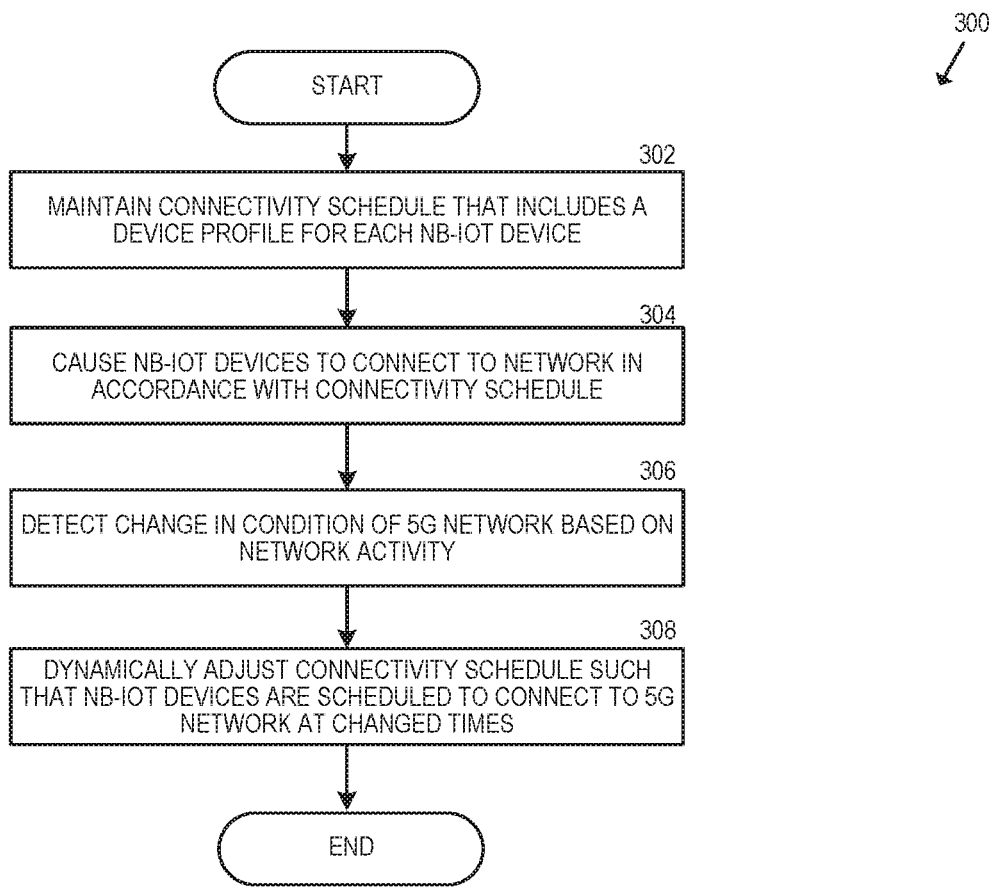
FIG. 3 is a flowchart that illustrates a method performed by one or more network nodes to update a connectivity schedule for intermittent connectivity between narrowband Internet-of-Things (NB-IoT) devices and a wireless telecommunications network.

FIG. 3 is a flowchart that illustrates a method 300 performed by one or more network nodes to update a connectivity schedule for intermittent connectivity between NB-IoT devices and a wireless telecommunications network ("network"). For example, the network node(s) can include a UDM node that authorizes access to the network by the NB-IoT devices in accordance with the connectivity schedule and a PCF including multiple access policies that implement the connectivity schedule. An example of an NB-IoT device includes a wireless device with a processor, memory, power source, sensor, and a transceiver that can intermittently connect with the network to report sensor data. The sensor data can be indicative of a temperature or image data captured by a camera enabled NB-IoT device. Hence, the NB-IoT device can intermittently connect to the network to provide updated sensor data.

At 302, the network node(s) can maintain the connectivity schedule, which includes a device profile for each of multiple NB-IoT devices. The connectivity schedule can include entries for each NB-IoT device in a device profile. The device profile can include device type, location, (e.g., GPS, country, state, city, region) and unique identifying information such as a MAC address or IP address. The device profile can also indicate a capability or communications service of the NB-IoT.

The network node(s) can obtain device-specific data indicative of a capability or service of an NB-IoT device from a SMF node or an IMS node of the network. The capability or service can be recorded in the schedule based on the device-specific data. Examples of the capability include total or remaining processor load capacity, memory capacity, and power capacity (e.g., battery charge remaining). Examples of services (e.g., communications services) include an emergency service (e.g., hospital, law enforcement, critical), a commercial service (e.g., business, standard), and a non-commercial service (e.g., leisure, basic).

The connectivity schedule can categorize NB-IoT devices into groups of priority levels based on capabilities or services of the NB-IoT devices. The priority levels can be hierarchical to include high, medium, or low priority levels. Hence, the connectivity schedule can categorize NB-IoT devices according to services that they individually or collectively support. For example, the network node(s) can categorize NB-IoT devices into a high priority level for an emergency service, a medium priority level for a commercial service, and a low priority level for a non-commercial service.

In one example, an NB-IoT device that is categorized in the high priority level can be scheduled for connecting to the 5G network more frequently or for a longer time period compared to any NB-IoT device that is categorized in a medium priority level, and another NB-IoT device that is categorized in the medium priority level is scheduled for connecting to the network more frequently or for a longer time period compared to any NB-IoT device that is categorized in the low priority level. In another example, the levels can include threat levels that indicate the risk or threat to the network of a cybersecurity attack. For example, a hierarchy of threat levels can include high, medium, and low risk or threat levels.

At 304, the network node(s) can cause the NB-IoT devices to connect to the network in accordance with the connectivity schedule. In particular, the NB-IoT devices connect intermittently with different time patterns based on the priority levels of the NB-IoT devices. The different time patterns can include connecting to the network beginning at different points in time or connecting for different time periods (e.g., time durations). For example, five NB-IoT devices can be scheduled to connect to the network every hour for 15 minutes, where the beginning of any connection is offset from any other connection by 1 minute. In other example, the five NB-IoT devices are scheduled to connect to the network every hour for different time periods (e.g., 1, 2, 3, 4, or 5 minutes). In yet another example, the five NB-IoT devices can connect intermittently with the network based on combinations of different time periods beginning at different points in time.

In one example, a high priority NB-IoT device (e.g., supports emergency services) is schedule to connect before or for a longer period relative to a medium-priority NB-IoT device (e.g., supports commercial services), which is scheduled to connect before or for a longer period relative to a low-priority NB-IoT device (e.g., supports non-commercial services). The schedule does not necessarily indicate fixed times to connect to the network. Instead, the schedule can indicate a priority order for NB-IoT devices to connect to the network when the network is available to establish and/or maintain the connections. For example, when the network has a limited bandwidth, only high-priority NB-IoT devices can connect and, as more bandwidth becomes available, the medium-priority NB-IoT devices are allowed to connect to the network before allowing the low-priority NB-IoT devices to connect to the network. In another example, the different time patterns are unique among priority levels such that any NB-IoT devices of a specific priority level connect to the network at the same point in time or for the same time period.

At 306, the network node(s) detects a change in a condition of the 5G network based on a network activity. Examples include a change of a network load such as an increase or decrease in network traffic or quantity of devices connected to the network. This can occur, for example, when there is a sports or political event in an area with NB-IoT devices such that the network gets overloaded with connection requests from other wireless devices in an area.

At 308, in response to a detected change in a current condition of the network, the system can dynamically adjust the connectivity schedule such that at least some of the NB-IoT devices are scheduled to connect to the 5G network according to new time patterns different from the previous time patterns. For example, when the network load increases, the connectivity schedule is adjusted to reduce the connectivity of lower priority NB-IoT devices and increase or maintain the connectivity of higher priority NB-IoT devices. Similarly, when the network load decreases, the connectivity schedule is adjusted to increase the connectivity of lower priority NB-IoT devices.

The adjustments can occur per one or more (e.g., groups) of NB-IoT devices. For example, the connectivity schedule can group NB-IoT devices according to regions of the network. That is, the NB-IoT devices can belong to different regional groups. The connectivity for one group can be adjusted one way while the connectivity for a second group can be adjusted another way, in response to the same detected condition of the network.

Configurable UICC Integrated in NB-IoT Device

The disclosed technology includes a Universal Integrated Circuit Card (UICC) that is integrated into an NB-IoT host device. An example of a UICC is a Subscriber/Services Identification/Identity Module (SIM) card that provides authentication and encryption for smartphones. For example, a UICC can securely store an International Mobile Subscriber Identity (IMSI) and related cryptographic key used to identify and authenticate a subscriber on a host device. The stored key information can include a unique serial number, security authentication and ciphering information such as an authentication key (e.g., a 8-bit, 64-bit, 128-bit, 128-bit, or 256-bit encryption keys), temporary information related to a local network, which is received from a local carrier, a list of services that a subscriber can access such as an operator-specific emergency number, Short Message Service Center (SMSC) number, Service Provider Name (SPN), Service Dialing Number (SDN), advice-of-charge parameters, and Value Added Service (VAS) application. The UICC can also store passwords such as a Personal Identification Number (PIN) and a Personal Unblocking Code (PUK) for PIN unlocking.

In operation, a conventional UICC identifies a subscriber and a wireless operator so that a network can identify the subscriber's service plan and services. A UICC can store data about user contacts and enable a cryptographically secure and reliable connection with the network. In some instances, the UICC is the best and only universal application delivery platform that works for mobile devices. The UICC ensures the integrity and security of all kinds of personal data and it typically holds a few hundred kilobytes of data.

A UICC can store several applications. An example of an application is an IP Multimedia Services Identity Module (ISIM), which includes an Application Dedicated File (ADF) that contains multiple Elementary Files (EFs). This module contains parameters for identifying and authenticating the user to the IMS. The ISIM can include an IP Multimedia Private Identity (IMPI), a home operator domain name, one or more IP Multimedia Public Identity (IMPU) and a long-term secret used to authenticate and calculate cipher keys. The IMPU stored in the ISIM can be used in emergency registration requests. The authentication and key agreement mechanism are typically run by the IMSI is required for services in the IMS.

A typical UICC (e.g., SIM card) is not physically integrated into a host device and is not remotely configurable. Further, a conventional UICC consumes the same amount of host resources regardless of the host device, which is problematic in the context of diverse, low-power NB-IoT devices that could benefit from flexible authentication and encryption functions, which could be part of an application or service that are broadly referred to herein as "resources." Hence, existing UICC technology treats NB-IoT devices the same way, which is inefficient given the diversity of the NB-IoT devices and their varying needs for authentication and encryption. For example, an NB-IoT device that regularly supports high volumes of network traffic and has a high risk of being hacked should implement one or more robust authentication and encryption functions. On the other hand, another NB-IoT device that rarely communicates with the network, is in a geographically secure area (e.g., unreachable by bad actors), and has limited services run by a battery with a limited capacity could run more efficiently with a relatively weaker authentication and encryption service.

An embedded-SIM (eSIM) or embedded universal integrated circuit card (eUICC) is a form of programmable SIM card that is embedded directly into a device. In machine to machine (M2M) applications, where there is no requirement to change the SIM card, this avoids the requirement for a connector, which improves reliability and security. An eSIM can be provisioned remotely and end-users can add or remove operators without the need to physically swap a SIM from the device. However, an eSIM is not dynamic; instead, a fixed set of resources of a host device are assigned for the eSIM.

The disclosed technology includes a UICC (also referred to herein as a virtual UICC) that is physically integrated into a host device to thwart hacking and enable remote re/configuring by the network to efficiently utilize NB-IoT device resources. As such, the network can determine and control an allocation of authentication and encryption resources to perform a necessary scope of UICC authentication and encryption functions. The authentication and encryption resources can be dynamically reset by a network node based on, for example, current network conditions, device capabilities, communications services, priorities, etc.

Figure 4:
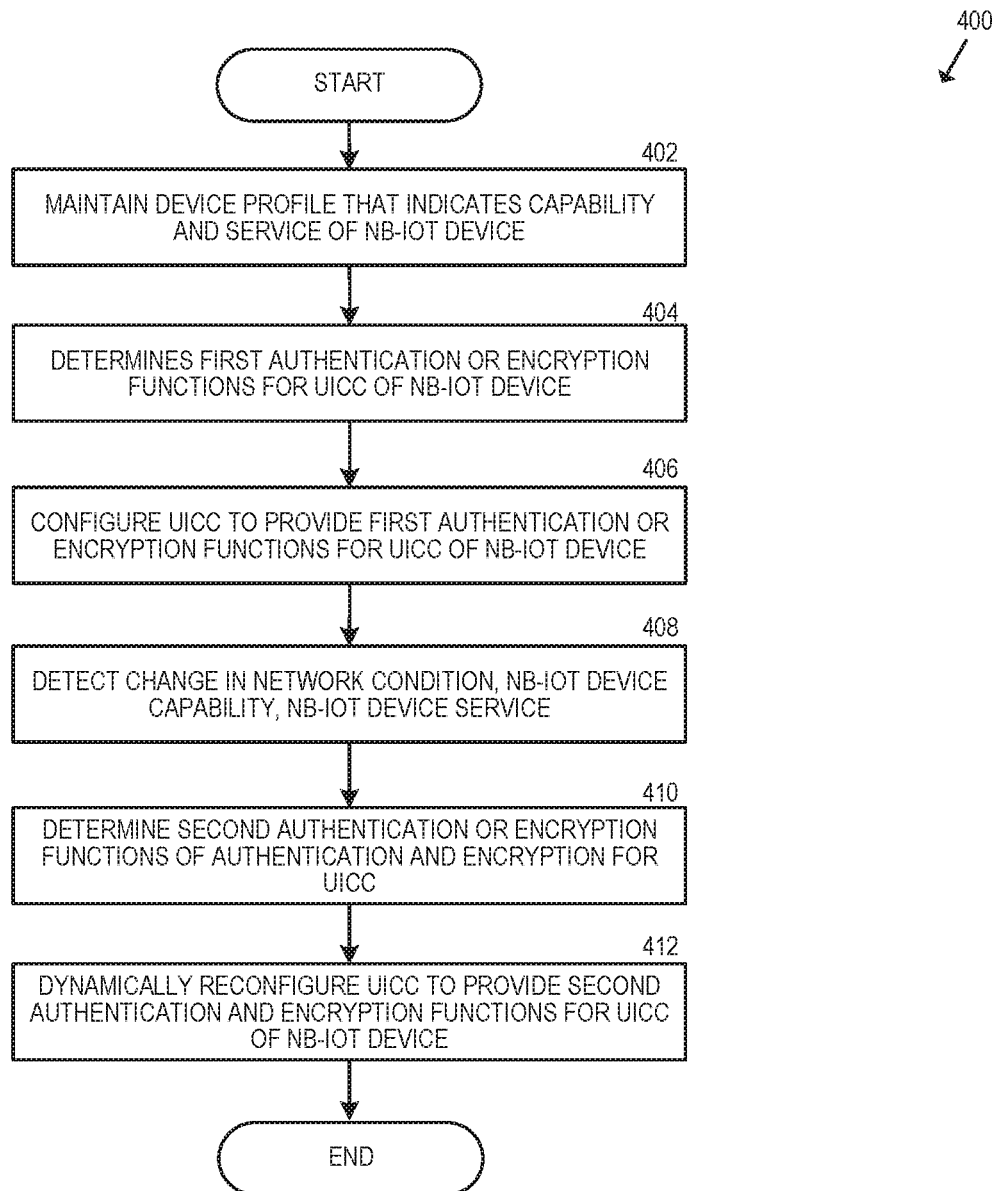
FIG. 4 is a flowchart that illustrates a method performed by one or more network nodes to configure a virtual integrated universal integrated circuit card (UICC) that is integrated in an NB-IoT device of a wireless telecommunications network.

FIG. 4 is a flowchart that illustrates a method performed by one or more network nodes to configure a virtual UICC in an NB-IoT device. Examples of the network node(s) include a combination of the network nodes shown in FIG. 2.

At 402, the network node(s) maintain a device profile that indicates a capability and a communications service of an NB-IoT device. Examples of capabilities include a storage, power, or process utilization or capacity (e.g., battery life). Examples of communications services include an emergency service, a commercial service, and a non-commercial service. The emergency service can include security, healthcare, or law enforcement communications that are supported by the NB-IoT device. For example, an NB-IoT device that generates data of a hospital can be designed for emergency services. Examples of the commercial service include any communications service for business operations, and non-commercial service can include ordinary or leisure communications services. The commercial service can be designated as part of a service plan for businesses while the non-commercial service can be a default basic service.

At 404, the network node(s) determines one or more authentication and encryption functions for the UICC of the NB-IoT devices. The authentication and encryption functions can be required to support the communication service of the NB-IoT device based on the capability of the NB-IoT device and a condition of the network. In one example, the NB-IoT device is categorized in one of multiple categories that are each associated with a categorical authentication and encryption function. Then, the authentication and encryption functions can be set to include the categorical authentication and encryption functions. In another example, the network node(s) designate a priority level for the NB-IoT device and the authentication and encryption functions are set based in part on a priority level of an NB-IoT device. The priority levels can be hierarchical to include high, medium, and/or low priority levels. A priority level can be set based on a type of communication service that it supported by a particular NB-IoT device. In another example, the levels can include threat levels that indicate the risk or threat to the network of a cybersecurity attack. For example, a hierarchy of threat levels can include high, medium, and low risk or threat levels.

At 406, the network node(s) configure the virtual UICC to allocate authentication and encryption functions of the NB-IoT device. The network node(s) can communicate a command over the network to cause the NB-IoT device to adjust an allocation of an authentication and encryption function of a UICC. For example, the network nodes can change an encryption strength of a cypher key employed by the NB-IoT device. That is, the authentication and encryption functions associated with a UICC, as described earlier, can be adjusted remotely from the network based on the state of the NB-IoT device and a current network condition, which ensures flexibility to dynamically adjust to a change or to provide a suitable degree of authentication and encryption services when needed, and not more than necessary.

At 408, the network node(s) detect one or more change(s) of the condition of the network, the capability of the NB-IoT device, or a communications service supported by the NB-IoT device. A changed condition can include a changed load of the network based on a quantity of devices connected to the network or an amount of network traffic communicated on the network. In another example, the changed condition can include the addition of a network access node such as a base station or addition of a second NB-IoT device that can be used to offload communications from the first NB-IoT device. An example of a changed capability includes a changed storage capacity or a power capacity (e.g., remaining battery) of the NB-IoT device.

At 410, in response to the detected change, the network node(s) determine one or more updated authentication and encryption functions for the UICC of the NB-IoT device. For example, an NB-IoT can have a default non-commercial service, which can be changed remotely to a commercial service. The change to the commercial service can be accompanied to a change in an authentication or encryption function of the NB-IoT device. In another example, the network node(s) can determine that an NB-IoT device changed to support an emergency service and, switch an authentication or encryption function of the NB-IoT device for more robust security. In yet another example, a changed condition can also relate to the same service (e.g., emergency, business, leisure) at different threat levels (e.g., high, medium, low) to the network. For example, the network nodes(s) can adapt a connectivity schedule to provide a higher degree of encryption and lower connectivity when the network node(s) detect an increased threat to the network from an NB-IoT device, related communications, or service. Thus, the authentication and encryption functions are updated to support services based on a condition of the network (including a security threat), a capability of the NB-IoT device, or a service of the NB-IoT device.

At 412, the network node(s) dynamically reconfigures the virtual UICC to support the second authentication and encryption functions for the UICC of the NB-IoT device. In one example, the second authentication and encryption functions are more robust relative to prior authentication and encryption functions, and the UICC is reconfigured for the second authentication and encryption functions when a network condition changes, such as an environment where the NB-IoT device primarily supports a commercial service and where the network load has increased. Likewise, the new authentication and encryption functions can be weaker when a network load is consistently lower. In another example, a detected change in the battery capacity of the NB-IoT device can cause the network node(s) to dynamically reconfigure the NB-IoT for weaker authentication and encryption functions that consume less energy. In yet another example, the current authentication and encryption functions are changed to support a new service that demands increased complexity or utilization of host device resources. Conversely, authentication and encryption functions can be reset lower when a complexity or utilization of the service decreases.

Key Management system for NB-IoT Devices

The disclosed technology includes a NB-IoT key management system that can dynamically provide keys of different encryption strengths to NB-IoT devices. Normally, an NB-IoT device must be authenticated every time that it connects or reconnects to a telecommunications network (e.g., 5G network). The authentication process involves a key exchange between the NB-IoT device and a network node. Further, a conventional network generates encryption keys with the same level of encryption strength. This conventional technique provides a baseline threshold amount of security for a network. However, the same technique applied to NB-IoT devices is problematic because, for example, 5G networks support numerous diverse and low-cost NB-IoT devices that do not all need the same baseline level of encryption strength to secure all the device and its communications the same way. For example, NB-IoT devices that pose less security risks or are less critical can use an encryption key with a lower encryption strength that is less computationally burdensome to generate and process by the NB-IoT device and the network. Doing so improves the efficiency of the network and the NB-IoT device, which could have limited computational and energy resources.

The encryption keys can range in strength from high (e.g., robust) encryption strength to low (e.g., weak) encryption strength. The network node(s) can generate and distribute a finite number of each type of key. For example, the network node(s) can generate a greater quantity of 8-bit encryption keys compared to a quantity of 64-bit encryption keys. The 8-bit encryption keys are less burdensome to process (e.g., decipher) by the NB-IoT device and the network such that distributing encryption keys with lower encryption strengths is favored, where doing so does not unduly risk the security of the network. The network can dynamically adjust the encryption strength of an encryption key for an NB-IoT device to accommodate and/or adapt to a changing network or changes to the NB-IoT devices.

Figure 5:
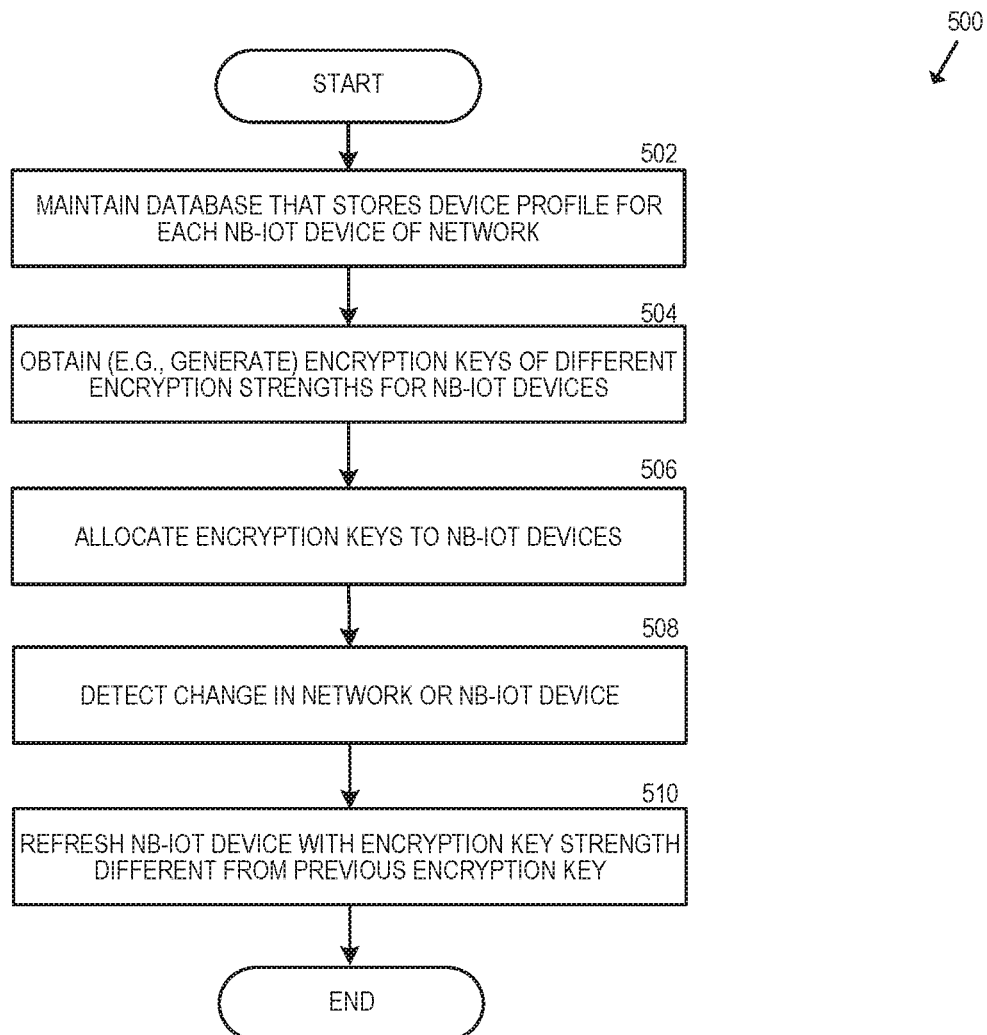
FIG. 5 is a flowchart that illustrates a method performed by one or more network nodes to dynamically manage encryption keys of varying encryption strengths for NB-IoT devices of a wireless telecommunications network.

FIG. 5 is a flowchart that illustrates a method 500 performed by network node(s) to dynamically manage (e.g., generate, distribute, and update) encryption keys of varying encryption strengths for NB-IoT devices of a wireless telecommunications network. Examples of the network node(s) include any combination of the nodes shown in FIG. 2.

At 502, the network node(s) maintain a database that stores a device profile for each NB-IoT device. A device profile indicates a capability or a communications service of an NB-IoT device. Examples of capabilities include storage, power, or processor capabilities including capacities and utilization. In one example, a capability includes a security profile where an encryption key strength is proportional to the security profile. Hence, the profile indicates a degree of security required by the NB-IoT device Examples of the communications service include an emergency service, a commercial service, and a non-commercial service. The emergency service can include security, healthcare, or law enforcement communications that are supported by the NB-IoT device. For example, an NB-IoT device that is physically located by a hospital can be designed for emergency services. Examples of a commercial service include a service for business operations, and non-commercial service can include basic or leisure services. The commercial service can be designated as part of a subscriber plan for businesses while the non-commercial service can be a default basic service for subscribers. In some instances, an NB-IoT device is classified or categorized into priority levels based on the device capability or the communications service of the NB-IoT device. Examples of a hierarchical priority levels include high, medium, and low priority levels. The priority levels can be set based on the type of communications services that are supported by the NB-IoT device. The NB-IoT devices can be categorized into one or more of the priority levels based on the communications service of the NB-IoT device.

At 504, the network node(s) obtain multiple encryption keys for the NB-IoT devices. The encryption keys are associated with different encryption strengths. Examples include a high encryption strength key, a moderate encryption strength key, a low encryption strength key, and an ultra-low encryption strength key. In one example, the high encryption strength key is a 256-bit encryption key, the moderate encryption strength key is a 128-bit encryption key, the low encryption strength key is a 64-bit encryption key, and the ultra-low encryption strength key is an 8-bit encryption key. The encryption and decryption processing for stronger encryption keys is more secure but is also resource intensive compared to weaker encryption keys.

Hence, using encryption keys can improve the efficiency of individual NB-IoT devices and the network as a whole.

The network node(s) can generate a finite number of each type of encryption key based in part on a current condition of the 5G network. The current condition of the network can include, for example, a quantity or type of wireless devices being supported by the network. Another example includes the current or statistical average network traffic on the network. Further, the encryption keys can be generated algorithmically based on a condition of the network and/or values associated with the NB-IoT devices such as locations, etc.

In 506, the network node(s) allocate encryption keys to NB-IoT devices. The network node(s) thus enable authentication of the NB-IoT devices in accordance with key exchange processes between the multiple NB-IoT devices and the network by using the encryption keys of different encryption strengths. Further, the encryption keys can be used as a cypher to encrypt/decrypt the communications of the NB-IoT devices, in some implementations.

The network node(s) can distribute the encryption keys to the NB-IoT devices based on communication services of the NB-IoT devices and in accordance with a normal (e.g., default) distribution scheme. In the default distribution scheme, the encryption keys are distributed by allocating lower strength encryption keys before allocating higher strength encryption keys, where possible, balanced against the security needs of the network. In particular, the network node(s) distributes low encryption strength keys after any ultra-low encryption strength keys, distributes moderate encryption strength keys after low encryption strength keys, and distributes high encryption strength keys after moderate encryption strength keys. The network node(s) can distribute a high encryption strength key despite readily available lower encryption strength keys when an NB-IoT device provides an emergency service or when the NB-IoT has a greater risk of being hacked (e.g., is physically accessible to a bad actor).

The encryption keys for NB-IoT devices can be selected from finite sets of different encryption keys. That is, the available encryption keys can include a limited number of encryption keys in each of the different key sizes. As such, a first encryption key of a first encryption strength is allocated for a first NB-IoT device based on a first capability or a first communication service of the first NB-IoT device. A second encryption key of a second encryption strength is allocated for a second NB-IoT device based on a second capability or a second communication service of the second NB-IoT device, and so on. In one example, a high encryption strength key is allocated for an NB-IoT device that supports a high security risk service, a moderate encryption strength key is allocated for an NB-IoT device that supports a moderate security risk service, a low encryption strength key is allocated for an NB-IoT device that supports a low security risk service, and an ultra-low encryption strength key is allocated for an NB-IoT device that supports an ultra-low security risk service.

At 508, the network node(s) detect a change in a condition of the network or a change in a capability or a communications service of the NB-IoT device. A changed condition can include a changed load of the network based on a current quantity of devices connected to the network or volume of network traffic on the network. In another example, the changed condition can include the addition of a network access node such as a base station or addition of a second NB-IoT device that can be used to offload communications of the first NB-IoT device. An example of a changed capability includes a changed storage capacity or changed power capacity (e.g., remaining battery) of the NB-IoT device.

At 510, in response to the detected change, the network node(s) refresh a first NB-IoT device with a second encryption key of a second encryption strength different from the first encryption key of the first encryption strength. For example, refreshing the first NB-IoT device with the second encryption key can include replacing the first encryption key with the second encryption key or updating the first encryption key with the second encryption key (e.g., increase the encryption strength without replacing the key).

In an example, the network node(s) detect an increased load on the network and, in response, refresh the encryption keys of at least some of the NB-IoT devices in accordance with a high load allocation scheme where higher encryption strength keys are replaced with lower encryption strength keys. In another example, the network node(s) detect a decreased load on the network and, in response, refresh the encryption keys of at least some of the NB-IoT devices in accordance with a low load allocation scheme where lower encryption strength keys are replaced with higher encryption strength keys.

Although the disclosed technology is described in the context of encryption keys of varying encryption strengths, implementations include other types of security features or forms of authentication. For example, the network node(s) can distribute any combination of different types of security features including encryption algorithms, error-detecting codes (e.g., cyclic redundancy check (CRC), hashing data integrity check), in addition or alternative to encryption keys. Hence, the network node(s) can cause the NB-IoT devices to employ different encryption algorithms, error-detecting codes, and/or encryption keys in response to a detected change as described earlier. For example, error-detecting codes can be initially distributed and, upon detection of an increased security threat to the network, the network node(s) can instantiate encryption algorithms or distribute keys for at least some of the NB-IoT devices that pose a greater threat to the network.

Computer System

Figure 6:
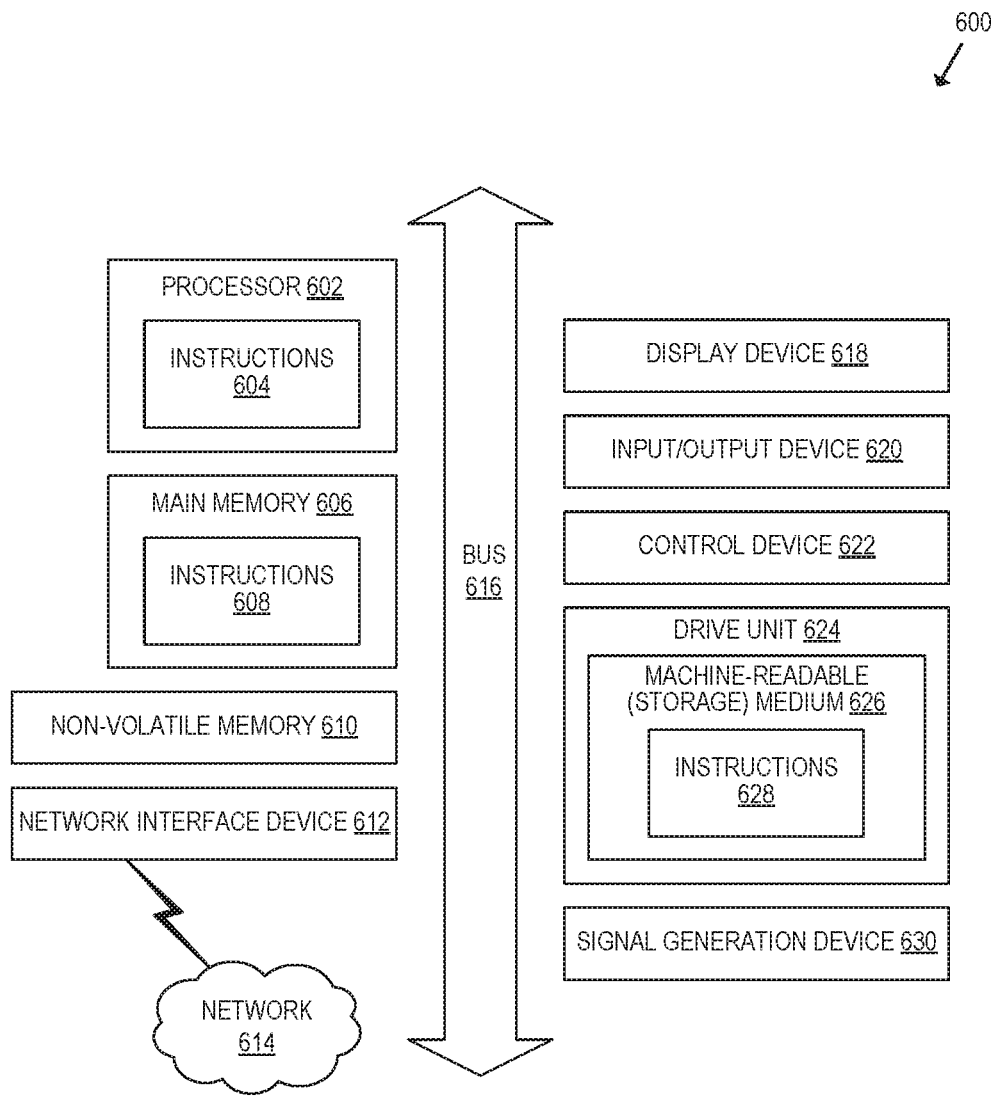
FIG. 6 is a block diagram that illustrates an example of a computing system in which at least some operations described herein can be implemented.

FIG. 6 is a block diagram that illustrates an example of a computer system 600 in which at least some operations described herein can be implemented. For example, components discussed in FIGS. 1-5 can include or host components of the computing system 600.

As shown, the computer system 600 can include one or more processors 602, main memory 606, non-volatile memory 610, a network interface device 612, video display device 618, an input/output device 620, a control device 622 (e.g., keyboard and point device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. The bus 616 therefore can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire"). Various common components (e.g., cache memory) are omitted from FIG. 6 for brevity. Instead, the computer system 600 is intended to illustrate a hardware device on which components illustrated or described relative to the examples of FIGS. 1-5 and any other components described in this specification can be implemented.

The computer system 600 can take any suitable physical form. For example, the computing system 600 may share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some embodiment, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The processor 602 can be, for example, a central processing unit, a conventional microprocessor (e.g., Intel Pentium processor). The memory (e.g., main memory 606, non-volatile memory 610, machine-readable medium 626) can be local, remote, or distributed. Although shown as single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. One of skill in the relevant art will recognize that the machine-readable medium 626 can include any type of medium that is accessible by the processor. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Although embodiments have been described in the context of fully functioning computing devices, the various embodiments are capable of being distributed as a program product in a variety of forms. Examples of machine-readable storage media, machine-readable media, or computer-readable media include recordable-type media such as volatile and the non-volatile memory devices 610, removable flash memory, hard disk drives, optical disks, and transmission-type media such as digital and analog communication links.

Software is typically stored in the non-volatile memory and/or the drive unit 624. When software is moved to the memory for execution, the processor 602 will typically make use of hardware registers to store values associated with the software, and local cache that, ideally, serves to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 612 enables the computing system 600 to mediate data in a network 614 with an entity that is external to the computing system 600 through any communication protocol supported by the computing system 600 and the external entity. Examiner of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 612 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

Examples of the I/O devices 620 include a keyboard, a mouse or other pointing device, disk drives, printers, a scanner, and other input and/or output devices, including a display device. Examples of the display device 618 can include a cathode ray tube (CRT), liquid crystal display (LCD), or any display device.

In operation, the computer system 600 can be controlled by operating system software that includes a file management system, such as a disk operating system. One example of operating system software with associated item management system software is the family of operating systems known as Windows® from Microsoft Corporation of Redmond, Wash., and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

REMARKS

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

While specific examples of technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples such that alternative implementations can employ differing values or ranges.

Details of the disclosed embodiments may vary considerably in specific implementations while still being encompassed by the disclosed teachings. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain embodiments are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will begin with the words "means for." However, the use of the term "for" in any other context is not intended to invoke a similar interpretation. The applicant reserves the right to pursue such additional claim forms in either this application or in a continuing application.

I claim:

1. A method performed by one or more network nodes for managing connectivity between multiple narrowband Internet-of-Things (NB-IoT) devices and a 5G network, the method comprising:

maintaining a connectivity schedule that includes a device profile for each of multiple NB-IoT devices,
wherein each device profile indicates a capability or a service of a respective NB-IoT device and includes a security profile of the respective NB-IoT device that is indicative of either a high, medium, or low threat to the network by the respective NB-IoT device, and
wherein the connectivity schedule categorizes each of the multiple NB-IoT devices into one of multiple priority levels based on the capability or the service of the NB-IoT device and further based on the security profile of the NB-IoT device;

causing the multiple NB-IoT devices to intermittently connect to or disconnect from the 5G network in accordance with the connectivity schedule,
wherein each NB-IoT device intermittently connects to the 5G network with a respective encryption key of a first encryption strength that is allocated to the NB-IoT device based on the device profile of the NB-IoT device,
wherein the multiple NB-IoT devices are caused to connect to the 5G network at different time patterns based on the multiple priority levels of the multiple NB-IoT devices, and
wherein the different time patterns include a particular time pattern for a particular NB-IoT device;

detecting a change in a condition of the 5G network based on network activity; and in response to the detected change in the condition of the 5G network, adjusting the connectivity schedule for the particular NB-IoT device to intermittently connect to or disconnect from the 5G network in accordance with a new time pattern different from the particular time pattern,
wherein the new time pattern is based on a particular priority level to which the particular NB-IoT device is categorized, and
wherein the particular NB-IoT device intermittently connects to the 5G network in accordance with the new time pattern with a new encryption key of a second encryption strength that is allocated to the NB-IoT device in response to the detected change in the condition of the 5G network.

2. The method of claim 1, wherein maintaining the connectivity schedule comprises:

obtaining device-specific data of each NB-IoT device from a session management function (SMF) or an IP multimedia subsystem (IMS) function;

updating the capability or service for the connectivity schedule based on the obtained device-specific data of the particular NB-IoT device; and categorizing each NB-IoT device into a high priority level for an emergency service, a medium priority level for a commercial service, and a low priority level for a non-commercial service,
wherein a first NB-IoT device that is categorized in the high priority level is scheduled for connecting to the 5G network more frequently or for a longer time period compared to any NB-IoT device that is categorized in the medium priority level, and
wherein a second NB-IoT device that is categorized in the medium priority level is scheduled for connecting to the 5G network more frequently or for a longer time period compared to any NB-IoT device that is categorized in the low priority level.

3. The method of claim 1, wherein the different time patterns include different points in time or different time periods for connecting the multiple NB-IoT devices with the 5G network.

4. The method of claim 1, wherein the one or more network nodes includes a unified data management (UDM) node that authorizes access to the 5G network for the multiple NB-IoT devices in accordance with the connectivity schedule and a policy control function (PCF) including multiple access policies that implement the connectivity schedule.

5. The method of claim 1, wherein adjusting the connectivity schedule comprises:

decreasing connectivity of lower priority NB-IoT devices when a network load increases; and increasing connectivity of lower priority NB-IoT devices when a network load decreases.

6. The method of claim 1, wherein the connectivity schedule groups NB-IoT devices per regions of the 5G network, and wherein the multiple NB-IoT devices belong to a first group, the method further comprising:

adjusting the connectivity for the first group in accordance with a first adjustment; and adjusting the connectivity for a second group of NB-IoT devices in accordance with a second adjustment different from the first adjustment.

7. The method of claim 1, wherein the capability includes an available load capacity and an available power capacity such that each NB-IoT device is categorized into one of the multiple priority levels based on the capability of the NB-IoT device.

8. The method of claim 1, wherein the service includes one of an emergency service, a commercial service, and a non-commercial service, and wherein each NB-IoT device is categorized into one of the multiple priority levels based on the service of a respective NB-IoT device.

9. The method of claim 1, wherein the particular NB-IoT device is caused to connect intermittently with the 5G network to report data generated by a sensor of the particular NB-IoT device.

10. The method of claim 1, wherein the different time patterns are unique between the multiple priority levels such that NB-IoT devices of each priority level connect to the 5G network at a common point in time or during a common time period.

11. At least one non-transitory computer-readable storage medium storing connectivity data for a narrowband Internet-of-Things (NB-IoT) device of a wireless network and storing instructions to be executed by at least one processor, wherein execution of the instructions cause the NB-IoT device of a wireless network to:

associate the NB-IoT device with a priority level of a hierarchy of priority levels;

cause the NB-IoT device to intermittently connect to the wireless network in accordance with a connectivity schedule,
wherein the NB-IoT device is caused to intermittently connect to the wireless network at unique times among multiple NB-IoT devices of the wireless network in accordance with the priority level,
wherein the connectivity schedule is based on a security profile of the NB-IoT device that is indicative of either a high, medium, or low threat to the wireless network by the NB-IoT device, and
wherein the NB-IoT device intermittently connects to the wireless network with a first encryption key of a first encryption strength that is allocated to the NB-IoT device based on the security profile of the NB-IoT device; and
dynamically adjust the connectivity schedule based on a current condition of the wireless network,
wherein the NB-IoT device is caused to intermittently connect to the wireless network in accordance with the adjusted connectivity schedule, and
wherein the NB-IoT device is allocated with a second encryption key of a second encryption strength based on the current condition of the wireless network.

12. The computer-readable storage medium of claim 11 further causing the NB-IoT device to, prior to adjusting the connectivity schedule:
receive an indication of a detect a change in a load of the wireless network,
wherein an increased network load causes a change in the connectivity schedule to reduce connectivity by the NB-IoT device, and
wherein a decreased network load causes a change in the connectivity schedule to increase connectivity by the NB-IoT device.

13. The computer-readable storage medium of claim 11, wherein the hierarchy of priority levels includes a high priority level associated with a critical service, a medium priority associated with a standard service, and a low priority level associated with a basic service for the multiple NB-IoT devices.

14. The computer-readable storage medium of claim 11, wherein the hierarchy of priority levels a high priority level for an emergency service, a medium priority category for a commercial service, and a low priority level for a non-commercial service.

15. A system of a wireless telecommunications network, the system comprising:
a policy control function (PCF) node configured to:
store multiple network access policies that define a connectivity schedule for multiple narrowband Internet-of-Things (NB-IoT) devices,
wherein the connectivity schedule includes intermittent time patterns during which the multiple NB-IoT devices are connected to the wireless telecommunications network, and
wherein the intermittent time patterns of the connectivity schedule are based on a security profile of each NB-IoT device that is indicative of either a high, medium, or low threat to the network by the NB-IoT device; and
a unified data management (UDM) node configured to:
enable the multiple NB-IoT devices to intermittently connect to or disconnect from the wireless telecommunications network in accordance with the multiple network access policies;
wherein each NB-IoT device intermittently connects to the wireless telecommunications network with a respective encryption key of a first encryption strength that is allocated to the NB-IoT device based on the security profile of the NB-IoT device;
receive an indication of a change of a condition of the wireless telecommunications network based on network activity; and
cause the PCF node to adjust the multiple network access policies based on the change of the condition of the wireless telecommunications network,
wherein the adjusted network access policies define an adjusted connectivity schedule that includes different time patterns during which the multiple NB-IoT devices are connected to the wireless telecommunications network, and
wherein each NB-IoT device connects to the wireless telecommunications network in accordance with the adjusted network access policies with a new encryption key of a second encryption strength that is allocated to the NB-IoT device in response to the change of the condition of the wireless telecommunications network.

16. The system of claim 15 further comprising:
a session management function (SMF) node configured to:
obtain device-specific data of the multiple NB-IoT devices, wherein the device specific data includes capability data or service data for the multiple NB-IoT devices; and
provide the device-specific data for the PCF node to generate the multiple network access policies based in part on capability data or service data included in the device-specific data.

17. The system of claim 15 further comprising:
an IP multimedia subsystem (IMS) node configured to:
obtain device-specific data of the multiple NB-IoT devices, wherein the device specific data includes capability data or service data for the multiple NB-IoT devices; and
provide the device-specific data for the PCF node to generate the multiple network access policies based in part on capability data or service data included in the device-specific data.

18. The system of claim 15, wherein the UDM node is configured to enable the multiple NB-IoT devices to connect to the wireless telecommunications network by authenticating each NB-IoT device in accordance with the connectivity schedule.

19. The system of claim 15, wherein the condition includes a load of devices connected to the wireless telecommunications network or a load of network traffic communicated over the wireless telecommunications network.

* * * * *